(No Model.) 2 Sheets—Sheet 1.

W. HADDOCK.
CABLE CONDUIT CURVE.

No. 399,037. Patented Mar. 5, 1889.

Attest.
J. M. Kennedy
C. E. Holley

Inventor:
Worcester Haddock
per Strehl & Hill
Attys.

(No Model.) 2 Sheets—Sheet 2.

W. HADDOCK.
CABLE CONDUIT CURVE.

No. 399,037. Patented Mar. 5, 1889.

Attest.
C. W. Bogart.
J. M. Kennedy.

Inventor.
Worcester Haddock
per Strehli & Hill
Attys

UNITED STATES PATENT OFFICE.

WORCESTER HADDOCK, OF CINCINNATI, OHIO.

CABLE-CONDUIT CURVE.

SPECIFICATION forming part of Letters Patent No. 399,037, dated March 5, 1889.

Application filed July 23, 1888. Serial No. 280,837. (No model.)

*To all whom it may concern:*

Be it known that I, WORCESTER HADDOCK, a citizen of the United States, and a resident of Cincinnati, Hamilton county, State of Ohio, have invented certain new and useful Improvements in the Construction of Cable-Conduit Curves, of which the following is a specification.

The object of my invention is to so construct the inner side of a cable-conduit curve as to admit of a sheave or sheaves being connected thereto, on which the cable travels while passing around the curve, the sheaves being so connected and the wall of the conduit so constructed as to admit of any one of the sheaves being removed while the cable is in motion without its coming in contact with the inner wall of said conduit.

Figure 1:
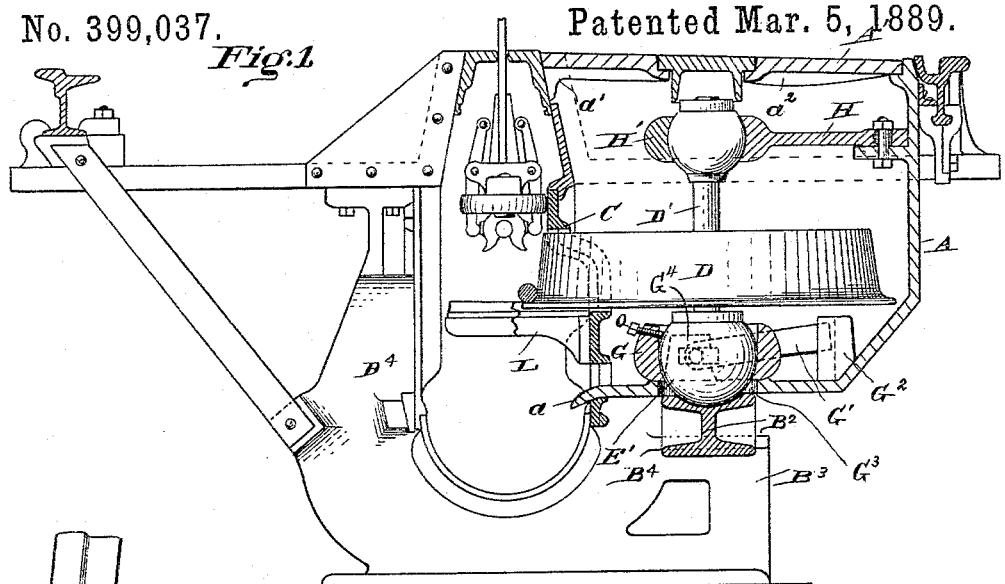
Figure 2:
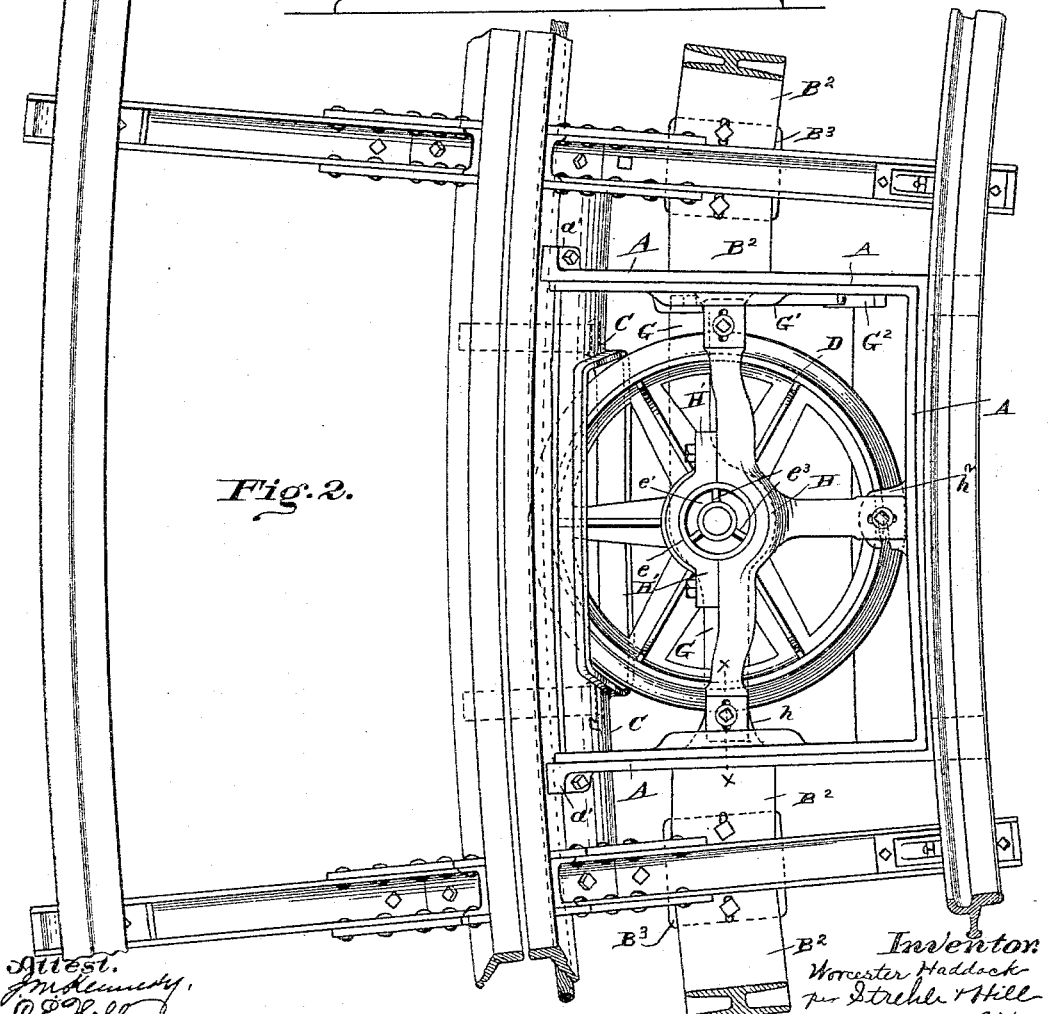
Figures 3, 7:
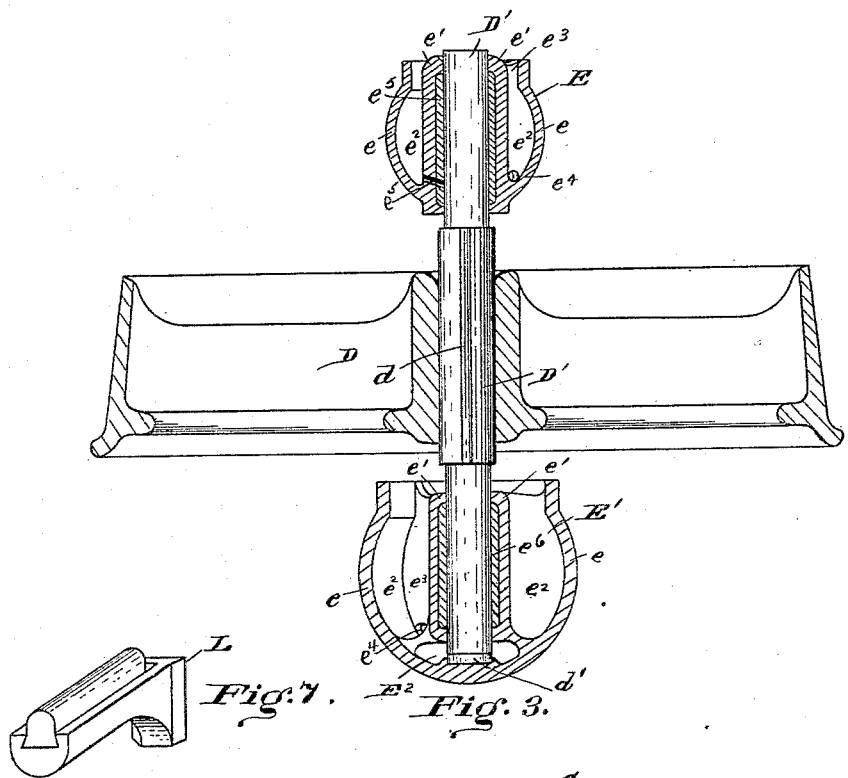
Figure 4:
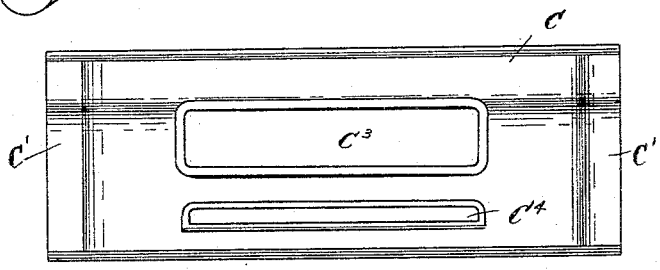
Figure 5:
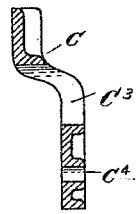
Figure 8:
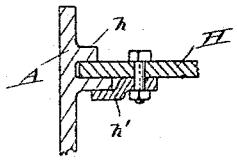
Figure 6:
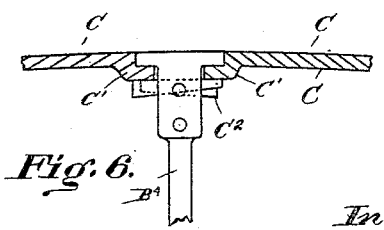

In the drawings accompanying this specification and forming a part thereof, Figure 1 is a cross-section through the conduit and one of the sheave-boxes, showing a sheave in an operative position therein and the preferred form of journal-bearings for the shaft of said sheave, also showing one form of device for retaining said journal-bearings in their proper position and for adjusting the sheave. Fig. 2 is a top view of one section of a cable-curve, showing one of the sheave-boxes, sheave, and connecting mechanism in an operative position. Fig. 3 is a central section through one of the sheaves and the preferred construction of journal-bearings for the shaft. Fig. 4 is a view in side elevation of the preferred form of plate which forms the inner wall of the conduit on the side where the sheave-boxes are attached. Fig. 5 is a vertical central section through the plate shown in Fig. 4. Fig. 6 is a top view of said side plates, partially broken away, showing the preferred form of connection between said plates and the side flanges of the yokes. Fig. 7 is a perspective view of one form of guard to prevent the cable dropping below the sheaves. Fig. 8 is a section taken at dotted line $x\,x$, Fig. 1, showing one form of clamp-connection between the two extensions of top brace and the lugs on the sides of the sheave-box.

The sheave-boxes A are preferably cast in in one piece, having a bottom portion and three sides, the side plate, C, of the conduit serving as a side plate for the boxes when in position. These boxes A are secured to place between the tram-rails and conduit and are bolted to the slot-rails through the flanges $a'$ of the box, as shown in Fig. 2, and rest upon the connecting-bars $B^2$, which latter rest upon and are secured to the extensions $B^3$ of the yokes $B^4$. The yokes are provided with the extensions or shoulders only on the inner side of the curve when it is desired to use the sheave-boxes.

The inner wall of the conduit, where the sheave-boxes are connected, is formed by a plate, C, which is connected to the side flanges of the yokes by the wedges $C^2$, said wedges being driven through a suitable opening in the yoke, forcing the flanges $C'$ of the plate up and against the side flanges of the yoke, as shown in Fig. 6.

This plate C has an opening, $C^3$, in it opposite the sheave, through which the periphery of the sheave projects when in position. An opening, $C^4$, is made in this plate below the sheave-opening, in which a portion, $a$, of the bottom of the sheave-box projects, (see Fig. 1,) thus affording a drain-opening from said box into the conduit. This side plate, C, is preferably made in the configuration shown in Fig. 5, which will permit of the sheave being removed without the cable coming in contact with the wall of the conduit and allowing the grip to travel around the side of the conduit-curve without the use of an extra friction or chafing plate.

Each sheave-box has a suitable lid or covering, A', which latter has a central cap, $A^2$, which may be removed when desired to oil the sheave. The lid A' is preferably provided with the strengthening-ribs $a^2$ on its under face.

The sheaves D may be supported in the boxes by any suitable operative mechanism, the preferred form being shown, which is of my invention, and is as follows: The sheave D is keyed or otherwise rigidly connected to the shaft D', said shaft having a vertical groove, $d$, in its face to permit the oil, after passing through the top journal-bearing to flow down and into the lower journal-bearing, as will more fully appear. The journal-bearings E and E' are preferably cast with an outer shell, $e$, and an inner shell, $e'$, leaving an oil-chamber, $e^2$, between them, said shells being connected by the vertical ribs $e^3$, (preferably three in number,) which have an opening, $e^4$, at their lower portion, thus connecting the oil-chambers $e^2$. In the top journal-bearing, E, an opening, $e^5$, is provided, leading from the oil-chamber $e^2$ to the shaft D'.

In the bottom journal-bearing, E', a circular oil-chamber, $E^2$, surrounds the lower bearing end of the shaft, the oil flowing from the chambers $e^2$ into said chamber $E^2$, from whence it is worked up and around the journal-shaft. The inner face of the shells $e'$ is recessed, in which a suitable babbitted bearing, $e^6$, is secured.

The lower journal-bearings, E', are supported and held in place in the sheave-boxes by the following preferable mechanism, viz: A suitable lever-bar, G, (shown partially in section in Fig. 1 and partially by dotted lines in Fig. 2,) is pivoted at one end between suitable lugs cast at one side of the lower portion of the box, the other end of said lever-bar sliding in a grooved lug, $G^4$, (shown by dotted lines in Fig. 1,) cast with the box, said bar having a hand-lever, G', pivoted thereto, the outer end of said hand-lever being adapted to impinge against and wedge in a grooved lug, $G^2$, cast to the box, as shown. The object of this arrangement of the lever-bar G and hand-lever G' is to afford a means of adjusting and moving the sheave inward out of the way of the cable when desired to remove the same. This journal-bearing E' rests in the circular opening $G^3$ in the lever-bar G, as shown, thus permitting said journal-bearing to adjust itself with reference to the shaft, after which said ball-journal is held to place by the nut-bolt O, screwed through the bar, as shown in Fig. 1.

The top journal-bearing, E, is held in place by means of the spider-shaped brace H and the cap or clamp H', one of the three extensions of said brace being bolted in the slotted lug $h^2$ at the rear top side of the box by means of a set-bolt, the other two extensions being secured to the lugs $h$ by means of clamps $h'$, a suitable bolt passing through said extensions and clamps, as shown in Fig. 8.

If desired, the clamps $h'$ may be bolted on the top of the brace-extensions and engage the top lugs. The object of this arrangement is to adjust the spider-shaped brace and with it the sheave. By loosening the clamps $h'$ the brace and sheave may be moved outward or inward, as desired, and again clamped to position. The cap or clamp H' is circularly concave on its inner face to fit the configuration of the top journal-bearing, said cap being bolted to the brace H, thus firmly clamping said journal-bearing to place.

To remove the sheave and shaft from the box, the lever-bar G is drawn outward from the conduit by raising the hand-lever G', which moves the lower journal-bearing, E', outward and with it the shaft and sheave away from and out of the sheave-opening in plate C. The clamps $h'$ (see Fig. 8) are then loosened and the brace and top journal-bearing lifted from off the shaft, when the shaft and sheave are free to be lifted from the box through the top opening.

To place one of the sheaves in position in the box, the lever-bar G is first connected in the bottom thereof, as aforedescribed, after which the journal-bearing E' is placed in the circular opening $G^3$ in said bar. The sheave and shaft are next inserted at the top of the box, the lower portion of the shaft being placed in the journal-bearing E'. The top journal-bearing, E, and brace H are then secured to place over the top portion of the shaft and adjustably secured in position within the box, as aforedescribed.

The sheave is adjusted with reference to the cable by means of the hand-lever G' and the brace H, by loosening the same and moving them outward or inward until the desired bearing on the sheave is obtained, when said hand-lever and brace are again secured to place.

The shaft D' rests and rotates upon a suitable steel hardened bearing-plate, $d'$, in the bottom portion of the journal-bearing E', as shown in Fig. 3.

To prevent the cable dropping below the sheave, I have provided the guards L, which may be attached to the plate C of the conduit in any desired manner at each side of the sheave. The top portion of the guard proper has a dovetailed groove, in which a piece of soft metal or wood is inserted, which extends above the top of the guard proper, substantially as shown in Figs. 1 and 7, the soft metal or wood being to prevent cutting the cable.

In the drawings I have shown but one sheave-box complete, as the number of sheaves to be used will depend upon the length of curve. The greater the curve the more sheaves and boxes must be used. The spaces between the sheave-boxes are filled in with concrete or other desired material.

The advantages of the aforedescribed construction are apparent. Any one of the sheaves may be adjusted or removed while the cable is in motion, as the curve in the plate C will admit of the sheave being removed without the cable coming in contact with the side of the conduit. The same configuration of slot-rail is used at the curve as in the straight line. The construction shown and described is such that it may be mounted on a truss-work, which is a very great advantage.

While the various features of my invention are preferably employed together, one or more of said features may be slightly varied without departing from the main feature of invention, and, in so far as applicable, one or more of said features may be employed in the construction of cable-curves other than that herein specifically set forth and shown.

What I claim as new, and desire to secure by Letters Patent, is—

1. In a cable-railway-curve construction, a series of sheave-boxes detachably connected to the slot-rails on the inner side of the curve, a space intervening between said boxes, said boxes being supported by a suitable connecting-bar resting upon extensions of the conduit-yokes, and a sheave suitably supported in said boxes in a horizontal position, the periphery of said sheaves projecting into the conduit through an opening in the side plate thereof, substantially as set forth.

2. In the construction of a cable-conduit curve, the sheave-box A, sheave D, shaft D', and ball journal-bearings E and E', in which the shaft rotates, the lower journal-bearing resting in a circular recess in the bar G, the top journal-bearing being secured to place in the box by means of the brace H and clamp H', substantially as set forth.

3. The construction herein shown and described for supporting and adjusting the sheave, consisting of the ball journal-bearings E and E', the journal-bearing E being secured in place on the shaft by a spider-shaped brace, H, and cap H', the journal-bearing E' resting in the circular recess $G^3$ in lever-bar G, said bar being pivoted at one end to suitable lugs in the box, the other end of said bar having the hand-lever G' pivoted thereto, substantially as set forth.

4. In combination with one or more sheaves mounted in boxes secured at one side of a cable-curve, the side plate, C, having the sheave-opening $C^3$ and drain-opening $C^4$, said plate being suitably connected to the yokes of the conduit, substantially as set forth.

WORCESTER HADDOCK.

Witnesses:
 E. S. HAVENS,
 JNO. W. STREHLI.